United States Patent [19]

Fithen et al.

[11] Patent Number: 5,513,889

[45] Date of Patent: May 7, 1996

[54] FILTER TONGS

[75] Inventors: Leslie E. Fithen; Michael R. Oglesby, both of Lubbock, Tex.

[73] Assignee: Extract-A-Filter, Inc., Lubbock, Tex.

[21] Appl. No.: 365,580

[22] Filed: Dec. 28, 1994

[51] Int. Cl.⁶ .................................................. B25J 15/08
[52] U.S. Cl. ................................. 294/97; 294/118
[58] Field of Search ................... 294/9–13, 16, 294/19.1, 22, 28, 31.1, 61, 62, 97, 106, 117–119; 29/270, 278, 283; 210/232, 237, 238, 541

[56] References Cited

U.S. PATENT DOCUMENTS

| | | | |
|---|---|---|---|
| 264,547 | 9/1882 | McCosh | 294/16 |
| 856,681 | 6/1907 | Oederstrom | 294/118 |
| 1,645,509 | 10/1927 | Tunstall | 294/97 X |
| 2,057,201 | 10/1936 | McCluskey | 294/118 X |
| 2,234,026 | 3/1941 | Smith | 294/118 X |
| 2,289,411 | 7/1942 | Denhard et al. | 210/541 X |
| 2,338,232 | 1/1944 | Cawood | 294/97 |
| 2,467,331 | 4/1949 | Mock | 294/97 X |
| 3,405,963 | 10/1968 | Neely | 294/16 |
| 4,002,365 | 1/1977 | Rader | 294/8 |
| 4,019,769 | 4/1977 | Filion | 294/19.1 |
| 4,215,889 | 8/1980 | Rayburn | 294/118 |
| 4,575,020 | 3/1986 | Strout et al. | 242/96 |
| 4,600,163 | 7/1986 | Hummel et al. | 242/96 |
| 5,110,167 | 5/1992 | Friend | 294/16 |

*Primary Examiner*—Johnny D. Cherry
*Attorney, Agent, or Firm*—Wendell Coffee

[57] ABSTRACT

Tongs have two arms pivoted together. A finger extends at an angle from one end of each arm. The tongs are used to remove a filter from a hood above a grill. A frame on the filter in the hood is engaged by the tips of the fingers when the fingers are extended. Then the filter with the frame is pulled from the hood.

16 Claims, 2 Drawing Sheets

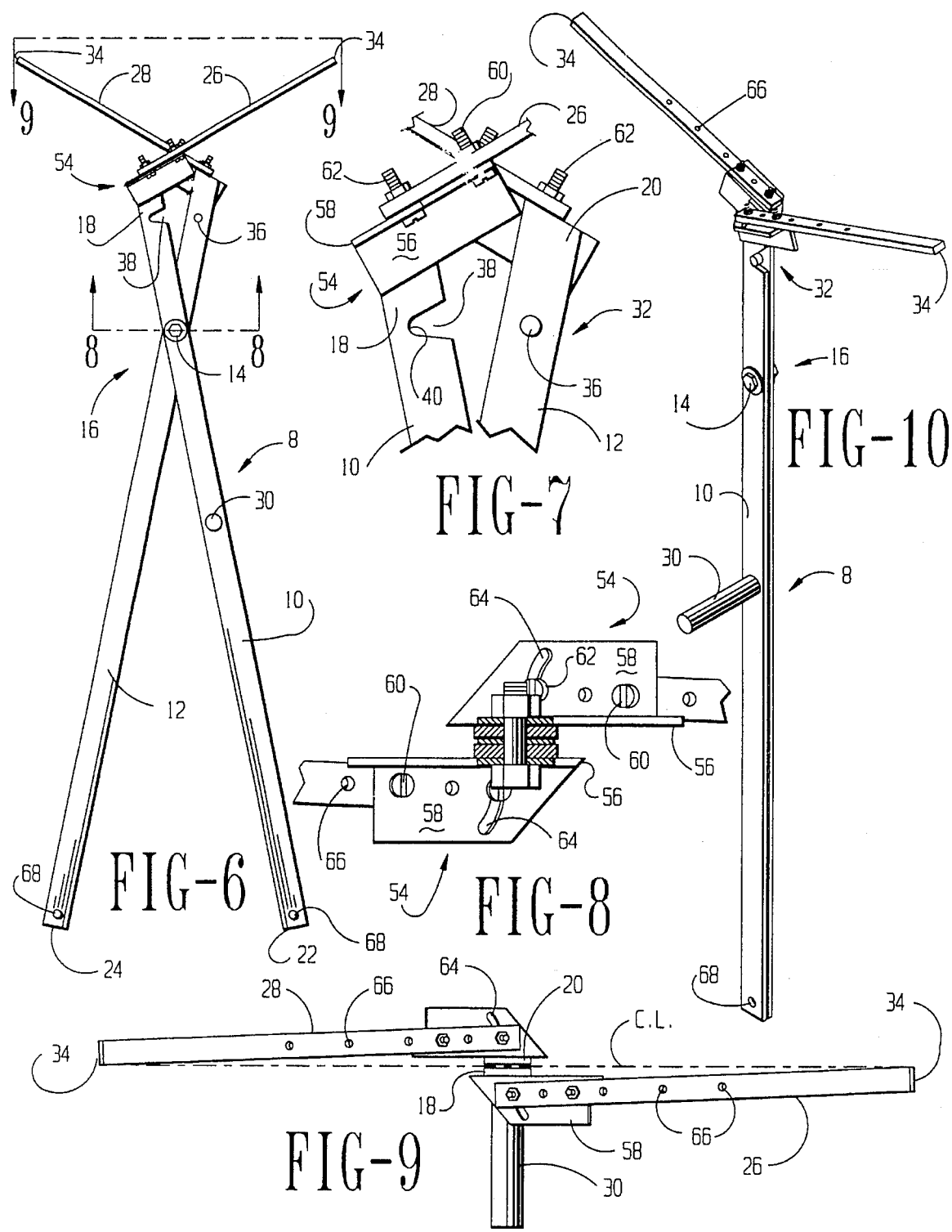

FILTER TONGS

CROSS REFERENCE APPLICATION

None.

BACKGROUND OF THE INVENTION

1. Field of the Invention

This invention relates to cleaning filters from filter hoods in commercial kitchens such as restaurants. Restaurant owners and chefs have ordinary skill in this art.

2. Description of the Related Art

It is customary for there to be exhaust or filter hoods above grills, stoves and other cooking apparatus in a commercial kitchen.

These filter hoods normally have fans mounted in exhaust vents. For environmental purposes, as well as for other reasons, normally the hoods will have filters within them to catch fumes, particularly grease vapors, and prevent them from being exhausted to the atmosphere.

A grease laden filter within the filter hood above a grill is a major source of fire within commercial kitchens. To minimize this it is desirable that the filters be removed and cleaned at regular intervals, for example once a week.

As stated, these filters are above grills or other cooking apparatus which are normally hot for the entire time the kitchen is in operation. Therefore, to remove the filter it is common practice to wait until the grill is cool. Then the cleaning person climbs on top of the grill or on a ladder above the grill and removes the filter from its holder within the filter hood. Once the filter is removed, it can be washed or cleansed and replaced.

Because this is a difficult task and also it is necessary to wait for the grill to cool, often this task of cleaning the filters is postponed. As stated above, the postponement of this causes a fire hazard.

SUMMARY OF THE INVENTION

(1) Progressive Contribution to the Art

This application discloses a filter tong by which a cleaning person may stand in front of the grill and with the tong reach above the grill. With the tong the filter is removed from its operating position within the filter hood. Then with the filter removed it may be cleansed and replaced. It is not necessary for the cleaning person to be any closer to the grill or above the grill more than the cooks would be in the ordinary normal performance of their tasks. Since the task can be done quickly and easily, the filters will be changed more often according to the regular schedule, eliminating fire hazards.

The tongs have two elongated arms which are pivoted together. Fingers are attached on the distal end of the arms. When the arms are separated (sprung apart) the fingers which engage the filter are in a retracted position. The fingers are placed against the filter and the arms brought into alignment. This will extend the fingers to engage a frame of the filter. Then, using the arms as a handle the filter may be pulled down. Once it is down the arms are separated to retract the fingers.

(2) Objects of this Invention

An object of this invention is to remove and clean filters from hoods above cooking apparatus in a commercial kitchen.

Further objects are to achieve the above with devices that are sturdy, compact, durable, lightweight, simple, safe, efficient, versatile, ecologically compatible, energy conserving, and reliable, yet inexpensive and easy to manufacture, operate, and maintain.

Other objects are to achieve the above with a method that is rapid, versatile, ecologically compatible, energy conserving, efficient, and inexpensive, and does not require skilled people to operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 1 shows a person in front of a grill with the tongs at the beginning of the process.

FIG. 2 shows the filter tongs in the position on the filter before being attached to the filter.

FIG. 3 shows the filter tongs attached to the filter while the filter is in its normal operating position in the hood.

FIG. 4 shows the tongs attached to the filter with the filter in the process of being removed from the hood.

FIG. 5 shows the filter attached to the tongs in a position it would be before it is placed in a pan of cleaning solution.

FIG. 6 is a side elevation of the tongs with the fingers retracted.

FIG. 7 is a detail of the attachment of the fingers to the arms.

FIG. 8 is a sectional view taken substantially on line 8—8 of FIG. 6 with the tongs closed and thus the fingers extended.

FIG. 9 is a top plan view taken substantially on line 9—9 of FIG. 6 with the tongs closed.

FIG. 10 is a perspective view of the closed tongs.

Figure 1:
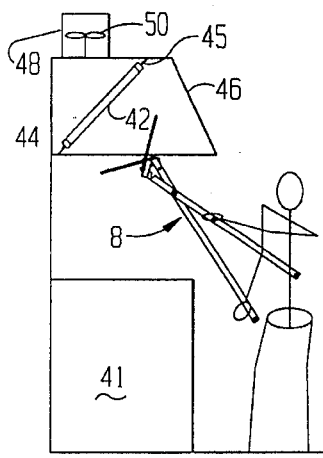
FIGS. 1 through 5 are schematic representations of the process steps involved in removing the filter. Specifically.

As an aid to correlating the terms of the claims to the exemplary drawing(s), the following catalog of elements and steps is provided:

tool—filter tongs
10 handle arm
12 stud arm
14 pivot pin
16 pivot point
18 distal end, handle
20 distal end, stud
22 proximal end handle
24 proximal end stud
26 hand finger
28 stud finger
30 handle
32 stop means
34 filter tip
36 stud 38 notch
40 bight
41 grill
42 filter
44 filter frame
45 filter holder
46 filter hood
48 vent
50 exhaust fan
50 pan
54 angle
56 arm leg
58 finger leg
60 pivot bolt
62 adjusting bolt
64 slot
66 size holes
68 hang hole
c.l. centerline

DESCRIPTION OF THE PREFERRED EMBODIMENT

Referring to the drawings, it may be seen that filter tongs or tool 8 includes two arms which are designated as handle arm 10 and stud arm 12.

The two arms are pivoted together by pivot pin 14 which is in the form of a bolt having an axis which extends through the two arms 10 and 12.

Pivot point 16 on each of the arms is about one-fifth of the total length of the arm from distal end 18 of the handle arm 10 and also about one-fifth of the distance of the total length of the arm from distal end 20 of the stud arm 12. Stated otherwise, proximal end 22 of the handle arm will be about four-fifths of the total length of the handle arm from the pivot point. Proximal end 24 of the stud arm 12 will be about four-fifths of the total length of the stud arm 12 from the pivot point 16. The length of the two arms 10 and 12 are the same.

Handle finger 26 is attached to the distal end 18 of the handle arm. Stud finger 28 is attached to the distal end 20 of the stud arm 12. The fingers or bars or spikes are elongated as are the arms. The axis of each finger angles about 112½ degrees from the axis of the arm to which it is attached.

The proximal end of each finger is attached to the distal end of its respective arm. The distal end of each finger will be referred to as filter tip 34.

Handle 30 is attached to the handle arm between the pivot point 16 and the proximal end 22 of the handle arm.

A stop means 32 is attached to the tongs for stopping the rotation of the arms in one direction when the arms are aligned or closed and the fingers and the filter tips are expanded a maximum span or distance apart. However, the stop means permits rotation of the arms from the aligned position in a direction which retracts the filter tips of one finger toward the other.

The stop means 32 could take many forms. For example, a flange could be placed upon either one of the arms so that the flange prevents the movement of the other arm in a first direction from alignment. The flange would permit the arms to move in a second direction which retracted the filter tips. Many other type stop means could be devised.

The preferred stop means is to place stud 36 upon the stud arm 12 adjacent to the distal end 20. The stud projects toward the handle arm 10. Notch 38 is cut into the handle arm 10 to receive the stud. The stud will be at the bight 40 of the notch 38 when the handles are aligned and the stud will move away from the bight 40 when the arms are rotated in a direction which retracts the filter tips 34, which is to say the filter tips move toward each other.

Figure 2:
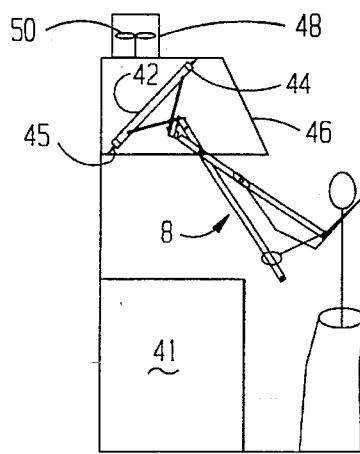

The basic operation of the filter tongs is shown in the sequence of FIGS. 1 through 5. The FIGS. 1 through 4 show a person standing in front of grill 41. The FIG. 1 shows the filter tongs in a slightly separated position which is to say that the filter tips would be in the retracted position. With the tool in such a position it is placed against filter 42 which is contained within filter frame 44 in holder 45 in filter hood 46. This position is shown in FIG. 2. The filter hood has vent 48. Exhaust fan 50 is within the vent 48.

Figure 3:
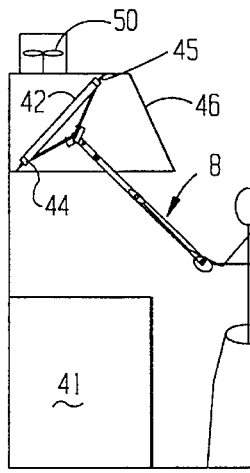
Figure 11:
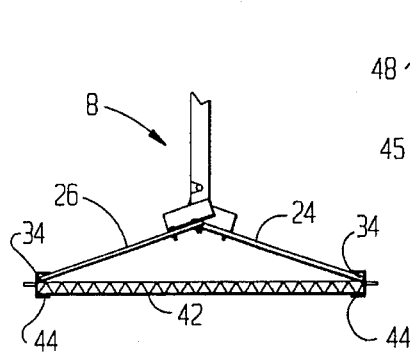
FIG. 11 is a detail of the fingers expanded and engaged with a filter frame which is shown in section.

With the filter tips contacting the filter, the arms 10 and 12 are closed or worked or moved to the aligned position. In this position the filter tips will engage the filter frame, thereby attaching the filter frame to the tool or filter tongs 8. This position is shown in FIGS. 3 and 11.

Figure 4:
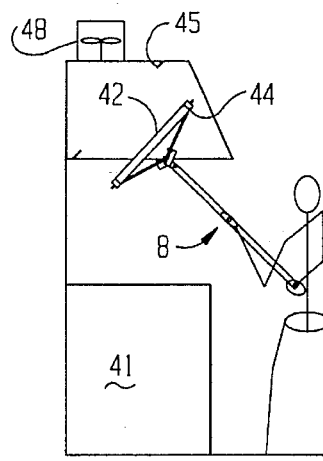

Then the tool 8 is moved away from the filter hood 46 removing the filter with its frame 44 attached to the tool 8 from the filter holder 45. Moving the tool 8 with the attached filter 42 thereto will remove the filter from the filter holder 45. This position is shown in FIG. 4.

Figure 5:
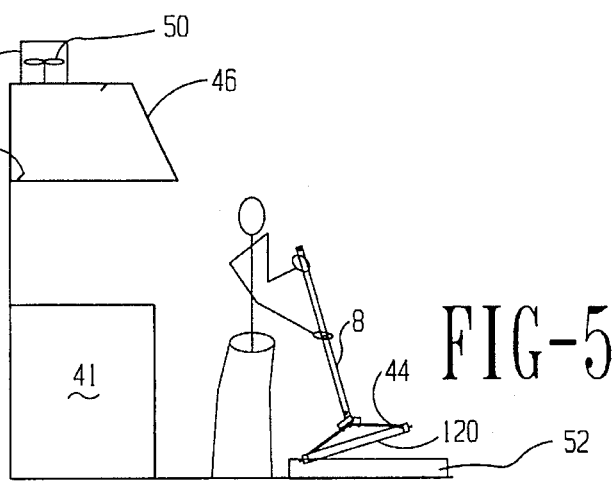

Then the filter is moved to pan 52 containing cleaning solution. This position is shown in FIG. 5. The filter may be released from the tool in the cleaning solution by rotating the arms about the pivot point to retract the filter tips from the filter frame.

If the filter has been released, after it is cleaned the filter tongs would again be attached to the filter frame. By reversing the operation it would be replaced into the filter hood. That is to say, it would be moved to the position shown in FIG. 4 and placed in the filter holder 45 as shown in FIG. 3. By rotating the arms, the tool 8 would be released from the filter frame 44 as seen in FIG. 2. The released tool 8 would be removed from the vicinity of the filter hood as seen in FIG. 1.

To attach the fingers 26 and 28 to arms 10 and 12, one of two angle members 54 (called angles 54 herein) is welded to each of the arms as seen in FIGS. 6 through 9. Each angle has arm leg 56 and finger leg 58. The arm leg 56 is flat with the arm. The angle will be more than 90 degrees to the arm but less than 135 degrees to the arm. The preferred angle is about 112½ degrees.

Each of the fingers 26 and 28 is bolted to the finger leg 58 of its angle. Pivot bolt 60 will extend through a circular hole in the finger leg. Adjusting bolt 62 will extend through slot 64.

As seen in FIG. 11, the fingers are spaced apart at the angles 54. By adjusting the adjusting bolt 62 in the slot 64, the filter tips 34 will be on center line c.l. The center line is in a plane perpendicular to the axis of pivot pin 14. When the filter tips 34 are expanded to attach to the filter frame 44, the filter tips will not exert a torque (or twist) upon the frame. Otherwise, the attachment or removal of the frame from the filter holder 45 would be difficult.

Fingers 26 and 28 have a series of size holes 66 so that the tool fits filter frames of different widths.

Each arm has a hang hole 68 near its proximal end for storing the tool on a hook or nail when not in use.

The embodiment shown and described above is only exemplary. We do not claim to have invented all the parts, elements or steps described. Various modifications can be made in the construction, material, arrangement, and operation, and still be within the scope of our invention.

For example, the adjustment of the length of the span of the filter tips 34 is part of our invention. Also, the adjustment of angles so that the filter tips are on the center line is part of our invention. However, this could be achieved by means other than the size holes 66 and the pivot bolt 60 and adjusting bolt 62. For example, the fingers 26 and 28 could be clamped in adjusted position in a rack or tube. Also, the elements could be clamped to get the filter tips in proper position by other well known mechanical elements.

The restrictive description and drawings of the specific examples above do not point out what an infringement of this patent would be, but are to enable one skilled in the art to make and use the invention. The limits of the invention and the bounds of the patent protection are measured by and defined in the following claims.

We claim as our invention:

1. A tool for removing and replacing a filter from a filter hood comprising:
    a) an elongated handle arm having
        i. a distal end,
        ii. a proximal end, and
        iii. a pivot point between the distal end and proximal end,
    b) an elongated stud arm having
        i. a distal end,
        ii. a proximal end, and
        iii. a pivot point between the distal end and the proximal end,
    c) the arms pivoted together at the pivot point of each arm by a pivot pin having a pin axis,
    d) an elongated handle arm finger extending at an angle to the handle arm having one end connected to the distal end of the handle arm, and a handle filter tip at the other end of the finger, and
    e) an elongated stud arm finger extending away from the handle arm finger and extending at an angle to the stud arm having one end connected to the distal end of the stud arm and a stud filter tip at the other end of the stud arm finger, and
    f) the arms and fingers all extending close to a plane normal to the pivot pin axis, so arranged and constructed that when the arms are closed to the aligned position then the fingers are extended a maximum distance apart.

2. The tool as defined in claim 1 further comprising:
    g) a handle on the handle arm between the pivot point and the proximal end.

3. The tool as defined in claim 1 further comprising:
    g) a stop means on the tool for stopping the rotation of the arms in one direction when the arms are aligned and the filter tips are extended a maximum distance apart and said stop means also for permitting the rotation of the arms from alignment in a direction which retracts the filter tips toward each other.

4. The tool as defined in claim 3 wherein said stop means includes:
    h) a stud on the stud arm, and
    j) a notch having a bight in the handle arm,
    k) said stud in the notch and contacting the bight when the arms are aligned and the filter tips are extended.

5. A filter in combination with the tool as defined in claim 1 further comprising:
    g) a filter in
    h) a filter frame, and
    j) said filter tips engaged with the filter frame.

6. The structure as defined in claim 5 further comprising:
    k) a filter holder in
    l) a filter hood, and
    m) said filter frame in said filter holder.

7. The tool as defined in claim 1 further comprising:
    g) a handle angle member with said handle finger attached thereto welded to said handle arm, and
    h) a stud angle member with said stud finger attached thereto welded to said stud arm.

8. The tool as defined in claim 7 wherein
    i) an axis of each angle member and finger is at an angle of between 90 degrees and 135 degrees to an axis of the arm to which the finger is connected.

9. The tool as defined in claim 8 wherein
    k) the angle of the axes is about 112½ degrees.

10. The tool as defined in claim 7 wherein each finger is attached to its angle member by:
    j) a pivot bolt extending through
        i. a circular hole in the angle member and
        ii. a hole in the finger, and
    k) an adjusting bolt extending through
        i. a slot in the angle member and
        ii. a hole in the finger.

11. The tool as defined in claim 10 further comprising:
    l) a series of size holes in each finger so that the tool can be sized for filter frames of different widths.

12. The tool as defined in claim 11 further comprising:
    m) a hang hole in each arm near its proximal end.

13. The tool as defined in claim 1 further comprising:
    g) said fingers are connected to the arms by a means for adjusting the finger tips span.

14. The tool as defined in claim 1 further comprising:
    g) said fingers connected to the arms by means for placing the filter tips on a center line in said plane normal to the pivot pin axis.

15. A tool for removing and replacing a filter from a filter hood comprising:
    a) an elongated handle arm having
        i. a distal end,
        ii. a proximal end, and
        iii. a pivot point between the distal end and proximal end,
    b) an elongated stud arm having
        i. a distal end,
        ii. a proximal end, and
        iii. a pivot point between the distal end and the proximal end,
    c) the arms pivoted together at the pivot point of each arm by a pivot pin having a pin axis,
    d) an elongated handle arm finger extending at an angle to the handle arm having one end connected to the distal end of the handle arm, and a handle filter tip at the other end of the finger,
    e) an elongated stud arm finger extending at an angle to the stud arm having one end connected to the distal end of the stud arm, and a stud filter tip at the other end of the finger,
    f) the arms and fingers all extending close to a plane normal to the pivot pin axis,
    g) a stop means on the tool for stopping the rotation of the arms in one direction when the arms are aligned and the filter tips are extended a maximum distance apart and said stop means also for permitting the rotation of the arms from alignment in a direction which retracts the filter tips toward each other, h) a stud on the stud arm, j) a notch having a bight in the handle arm, k) said stud in the notch and contacting the bight when the arms are aligned and the filter tips are extended.

16. A tool for removing and replacing a filter from a filter hood comprising:

a) an elongated handle arm having
   i. a distal end,
   ii. a proximal end,
   iii. a pivot point between the distal end and proximal end, b) an elongated stud arm having
   i. a distal end,
   ii. a proximal end,
   iii. a pivot point between the distal end and the proximal end, c) the arms pivoted together at the pivot point of each arm by a pivot pin having a pin axis, d) an elongated handle arm finger extending at an angle to the handle arm having one end connected to the distal end of the handle arm, and a handle filter tip at the other end of the finger, e) an elongated stud arm finger extending at an angle to the stud arm having one end connected to the distal end of the stud arm, and a stud filter tip at the other end of the finger, f) the arms and fingers all extending close to a plane normal to the pivot pin axis, g) a handle angle member with said handle finger attached thereto welded to said handle arm, h) a stud angle member with said stud finger attached there to welded to said stud arm, j) an axis of each angle member and finger at an angle of about 112½ degrees to an axis of the arm to which the finger is connected.

* * * * *